United States Patent [19]

Gauri

[11] Patent Number: 5,028,436

[45] Date of Patent: Jul. 2, 1991

[54] MEMBRANE PREPARATION AND PROCESS FOR SEPARATING THE DISSOLVED AND UNDISSOLVED CONSTITUENTS OF MILK

[76] Inventor: Kailash K. Gauri, Zur Waldburg 13, Lentfohrden, Fed. Rep. of Germany, D-2359

[21] Appl. No.: 399,530

[22] PCT Filed: Dec. 21, 1988

[86] PCT No.: PCT/EP88/01187

§ 371 Date: Oct. 17, 1989

§ 102(e) Date: Oct. 17, 1989

[87] PCT Pub. No.: WO89/05586

PCT Pub. Date: Jun. 29, 1989

[30] Foreign Application Priority Data

Dec. 21, 1987 [DE] Fed. Rep. of Germany ....... 3743440

[51] Int. Cl.$^5$ .............................................. A23C 1/14
[52] U.S. Cl. .................................... 426/491; 426/495; 210/651; 210/490
[58] Field of Search ................ 426/491, 495; 210/651, 210/500.23, 490

[56] References Cited

U.S. PATENT DOCUMENTS

| | | | |
|---|---|---|---|
| 4,140,806 | 2/1979 | Glimenius et al. | 426/491 |
| 4,203,848 | 5/1980 | Grandine, II | 210/490 |
| 4,539,117 | 9/1985 | Meyer et al. | 210/651 |
| 4,810,384 | 3/1989 | Fabre | 210/500.23 |
| 4,906,379 | 3/1990 | Hodgins et al. | 210/651 |

*Primary Examiner*—Marianne Cintins
*Assistant Examiner*—Helen Pratt
*Attorney, Agent, or Firm*—Bacon & Thomas

[57] ABSTRACT

In a process for separating the dissolved and undissolved constituents of milk, a microporous membrane with a pore size in the range of 0.1 to 2 $\mu$m is pretreated with an aqueous solution, dispersion or emulsion of lipids or peptides and the milk is separated on the pretreated membrane.

13 Claims, 2 Drawing Sheets

MEMBRANE PREPARATION AND PROCESS FOR SEPARATING THE DISSOLVED AND UNDISSOLVED CONSTITUENTS OF MILK

The invention concerns a process for separating the dissolved and undissolved constituents of milk.

The composition of the milk of mammals is well known. The dry content of the cow milk is know to be about 12.7% on average, of which 3.7% are fat components, 3.4% total serum protein. 4.7% lactose and about 0.7% ash. The protein component mainly consists of caseins and whey proteins. Moreover there are a non-proteinaceous nitrogen fraction, protease peptones and minor proteins, which are mainly enzymes.

Ordinarily milk is separated into caseins and whey proteins. This separation is by means of the so-called rennet precipitation in which rennin is added to warmed-up milk (30°-35° C.). The caseins then precipitate, the whey proteins remaining in solution. The same applies to the so-called acid precipitation of the caseins which takes place at the iso-electric point (cow milk pH 4.7). Caseins are heat-resistant, whereas the whey proteins are thermally labile.

It is further known to concentrate milk by reverse osmosis, in which practically pure water is removed from the milk, i.e. all the dissolved and undissolved milk constituents including the salts dissolved in the milk remain in the retentate and the permeate essentially consists of pure water. This is the way essentially in which presently the so-called condensed milk is prepared. However, reverse osmosis also is used to concentrate whey and when making curd-, yogurt-, and sour-milk.

It is further known to treat milk with ultra-filtration. However, only when using skim milk or whey will there be absence of difficulties in the enrichment of the milk proteins. Ultrafiltration of native full-cream milk, on the other hand, results only in incomplete separation. Milk separation by means of conventional membrane filters is impossible.

It is comparatively expensive to secure the whey proteins, which are especially desirable for nutritional and physiological reasons, when using the known methods. Moreover, the whey proteins obtained using the conventional methods as a rule are bacteria-contaminated and contain fat, and further contain the calcium and phosphate ions released upon the separation into caseins and whey proteins.

Accordingly, the object of the invention is to provide an improved process for separating milk into dissolved and undissolved constituents by resorting to membranes.

It was found in surprising manner that milk can be separated into its dissolved and undissolved constituents if it is made to pass through a microporous membrane pretreated with lipids and/or peptides.

Accordingly, the object of the invention is a process for separating the dissolved and undissolved milk ingredients, which is characterized by pretreating a microporous membrane with a pore size in the range from 0.1 to 2 microns (u) with lipids and/or peptides, and by separating the milk at the membrane so pretreated.

Advantageously, a fluorocarbon polymer based membrane shall be used. Especially preferred is a polyvinylidene fluoride membrane, for instance a so called DURAPORE membrane made by Millipore Co. (for instance the GLVP or HVLP type).

The membrane's pore sizes are preferably in the range from 0.1 to 1 u, in particular between 0.1 and 0.6 u.

The pretreatment may be with lipids or peptides alone, first with lipids and then with peptides. By means of this pretreatment, a membrane is obtained, which—contrary to the case of an untreated membrane—allows separating the milk into its dissolved and undissolved constituents. No explanation for the effect of pretreatment can be given. Still it might be a polarization effect.

The pretreatment of the membrane is simply carried out by exposing it to a flowing solution, emulsion or dispersion of the lipids and/or peptides in water. As a rule, lipid emulsion of 0.1 to 10%, preferably from 2 to 5% or a peptide solution of 0.01 to 10%, preferably from 0.1 to 5% shall suffice.

Appropriately, the pretreatment takes place at a temperature of 8° to 40° C. in particular from 15° to 35° C.

The duration of the pretreatment depends on the particular lipid or peptide used and on the concentration of the emulsion or solution flowing through the membrane. As a rule, pretreatment of 1 to 8 hours (h), in particular 2 to 5 h, is adequate to obtain a membrane permitting milk separation.

Especially for membranes with low pore sizes (for instance 0.1 to 0.4 u). The desired effect can be obtained with lipids alone. When membranes of larger pore sizes are pretreated with lipids, the milk constituents cannot be fully separated. In order to achieve full separation in such a case, it is enough to treat the membrane following its pretreatment with lipids, with peptides. This pretreatment in stages offers the advantage that the achieved effect is reversible and that the duration of pretreatment (especially as regards to the peptide treatment of the second stage) is reduced.

Pretreatment with peptides alone leads to the desired effect in the mentioned membranes and as a rule this effect will be permanent.

Preferably the lipids shall be unsaturated vegetable oils. Suitable examples are rapeseed oil, sunflower oil, coconut oil, peanut oil, olive oil, maize germ oil and linseed oil.

The peptides or mixtures of peptides used in the invention as a rule are peptides with short chains and molecular weights up to about 10,000—preferably up to about 5,000 and especially preferred up to about 2,000.

The following peptides are preferred in the invention:
(a) peptides, peptide fractions and peptide extracts from raw milk, fresh milk or whey proteins (obtained from raw or fresh milk),
(b) peptides, peptide fractions and peptide extracts obtained from the hydrolysates of raw milk, fresh milk, whey proteins, vegetable proteins (in particular banana proteins), animal proteins (from fish, eggs, meat) or bacterial proteins (especially yeast proteins), including raw milk treated with enzymes (for instance with liposes such as pancreatin and proteases such as fungal protease), per se,
(c) synthetic peptides, and
(d) raw milk.

Peptide fractions which can be isolated from raw milk, and the especially preferred peptide fractions arbitrarily denoted A, B and C illustratively can be obtained as follows:

untreated raw milk is subjected to membrane filtration using a 0.1 to 0.6 u membrane, the filtrate so obtained is subjected to a second membrane filtration using a membrane with a cutoff at 1,000 molecular weight, the filtrate so obtained in subjected to a third membrane filtration using a membrane with a cutoff at 6–10,000 molecular weight, the filtrate so obtained is subject to reverse osmosis at an open or closed membrane, in the event an open membrane is used, the filtrate so obtained is concentrated to about 20% of the volume subjected to reverse osmosis, is left to stand cold, and precipitated solids are filtered off, the filtrate so obtained is concentrated further and is set, using absolute ethanol, to an ethanol content of about 80% and then is filtered, the filtrate so obtained is concentrated, the residue is extracted with 90 to 95% ethanol, followed by filtration, and the filtrate then is concentrated, the residue so obtained is extracted using chloroform or isopropanol, the extract solution so obtained is concentrated till dry and the residue is isolated as product A in the form of a nearly colorless solid, in the event of using a closed membrane, the retentate (in lieu of the filtrate obtained when using the open membrane) is subjected to the above stated processing steps and thereby the product A is obtained and to produce B and C, the retentate of the third membrane filtration and/or the retentate IV from the reverse osmosis at the open membrane either is/are concentrated in vacuum and extracted with 80% ethanol, or in that by adding absolute ethanol an ethanol content of 80% is set, the undissolved proportions being then filtered off, the ethanol solution being concentrated till dry and thereby the product C obtained as a colorless substance, the remaining undissolved components from the ethanol treatment are extracted with 25% aqueous ethanol, the undissolved ingredients are filtered off, the filtrate is concentrated in vacuum till dry and thereby the product B has been prepared.

The product A is characterized by:
an HPLC band at RT 4.6; column=DEAE-5PW, Waters, Protein Pak, mobile phase: 10% methanol, 0.5 ml/minute;
an HPLC band at RT 26; column J-125 Waters, Protein Pak, mobile phase $KH_2PO_4$ 0.05 m; 0.5 ml/min
HPLC bands at RT 23.3 (weak); 25.3 (strong); 29.5 (average); 30.5 (average); 34.4 (weak);
column=I-125, Waters, Protein Pak
mobile phase: $KH_2PO_4$ 0.05 m; 0.5 ml/min;
ninhydrin positive reaction;
good solubility in chloroform, isopropanol, ethanol and water.

The substance B is characterized by:
HPLC bands at RT 19-20 (strong); 21.6 (shoulder); 24.3 (average);
column=I-125, Waters, Protein Pak
mobile phase: $KH_2PO_4$ 0.05 m; 0.5 ml/min;
good solubility in 20-30% aqueous ethanol,
ninhydrin positive reaction.

The substance C is characterized by:
HPLC bands at RT-21-22 (weak); 23.4 (strong) and 26.5 (strong) [conditions the same as in G-a];
ninhydrin positive reaction;
good solubility in 70 to 90% aqueous ethanol.

The preparation of these peptides is described below in relation to FIG. 1 schematically showing the preparation.

The initial material is fresh, untreated raw milk from a domestic animal, preferably cow milk. It may have been skimmed in conventional manner, for instance by centrifuging. However, skimming also may take place jointly with the ensuing first membrane filtration described below.

Said raw milk is subjected to a first membrane filtration at a microporous membrane with pore sizes in the range of 0.1 to 0.6 u, preferably 0.2 u. Advantageously the membrane filtration system should allow filtering in tangential flow. Illustratively a polyvinylidene fluoride membrane was found advantageous, such as a GLVP or HVLP "DURAPORE" membrane made by Millipore Co.

In this manner a clear permeate and a thickly flowing retentate are obtained. The permeate (i.e., the filtrate) contains all salts, lactose, amino acids, oligopeptides and poly-peptides of low molecular weights in genuine, non-denatured form. The retentate contains practically all casein and fatty components of the milk.

The dry substance of the filtrate (permeate) amounts to about 6% and the nitrogen content of the dry substance is about 1.2%. Dietetic foodstuffs and food additives may be prepared by concentration.

The filtrate from the first membrane filtration is subjected to a second membrane filtration at a membrane with cut-off value of 8–10,000 molecular weight. The so-called whey proteins remain essentially in the retentate. The filtrate essentially contains NPN compounds, lactose, short fatty acids and a few salts and is fed to a third membrane for filtration, of which the cut-off is at 1,000 molecular weight. The retentate arising there is further described below. The filtrate is fed to a reverse osmosis stage. Operation can be either with a so-called closed membrane or with a so-called open membrane. An applicable open membrane illustratively is an HF membrane made by Millipore Co., type Mr-3NF-40. When an open membrane is used, the desired product A shall mainly be in the filtrate.

In a processing, this product A is concentrated to about 20% of the volume initially present at the reverse osmosis and then is left standing at refrigerator temperatures. Solids are formed, and in particular lactose will crystallize. The solids are evacuated or filtered out. The mother liquor is concentrated again by a few percent and is set by means of ethanol to an alcohol content of 80%. When cold, another precipitation takes place, and the precipitate is separated by evacuation or filtration. The filtrate so obtained is concentrated until dry and then is extracted with an approximate ten-fold amount of 90 to 95% ethanol. The extract so obtained is concentrated till dry, and the residue obtained is extracted with isopropanol or chloroform. When the extract is concentrated till dry, the product A is obtained in the form of a colorless substance.

The product A is ninhydrin positive, evinces good solubility in chloroform, isopropanol, ethanol and water and chemically and chromatographically behaves like short-chain peptides.

When using a closed membrane for reverse osmosis, the product A is obtained from the retentate, whereas the permeate (filtrate) practically consists solely of water, of a few salts and of slight amounts of NPN compounds. Said retentate is processed in the same manner as described above for the filtrate of the reverse osmosis at the open membrane. However somewhat larger amount of the aforementioned organic solvents are needed because the retentate contains larger quantities of lactose and salts than the reverse-osmosis filtrate at the open membrane. In the manner already described, the reverse-osmosis retentate with closed membrane also yields the product A.

Approximately 100 mg of product A are obtained from one liter of milk.

As already mentioned, the product B/C is obtained from the retentate III of the third membrane filtration. The retentate is extracted by means of about a ten-fold volume of 80% ethanol. The ethanol extract solution is evacuated or filtered out and the residue is washed once more with a little 80% ethanol. Then an approximately ten-fold amount of 25% aqueous ethanol is used for extraction and during evacuation of the extract solution, another post-rinse takes place briefly. The extract solutions so obtained are always concentrated in vacuum till dry. In both cases a colorless solid is obtained, which is denoted here as the product B/C. The two fractions can be used separately or being combined.

The substance yielded by the 25% ethanol extract is denoted "B"; that obtained from the 80% ethanol extract is denoted "C", latter also being denoted hereunder at Rt-103.

Not only the products A, B and C may be used in the invention, but also the filtrates, extracts and the reverse-osmosis retentates obtained within the scope of the invention.

The described products can be obtained in the same described manner form so-called "fresh" milk (in the sense of the milk regulations).

Obviously, the initial substances also may be whey or the NPN fraction of a milk free of thermal denaturation. In that case the first and resp. the first and second membrane filtrations are eliminated.

These peptides especially preferred in the invention actually are also present in raw milk in minute amounts. Therefore it is possible also to carry out pretreatment of the membrane with raw milk. However, this entails significant length of treatment.

Among the protein hydrolysates described above in (b), those in PCT/EP86/00016 (corresponding to U.S. application Ser. No. 918,253) are preferred.

The remaining protein hydrolysates mentioned under (b) are prepared similarly to the method described in PCT/EP86/00016.

The following Figures are shown:

Figure 1:
FIG. 1 is a photograph of the filtrates obtained from the Example.

Using the process of the invention, it is possible to separate the dissolved and undissolved constituents of milk (especially in the tangential flow procedure). A clear filtrate (permeate) is obtained and a very viscous retentate. The filtrate contains the dissolved constituents, namely all salts, lactose, amino acids and other NPN components and also oligopeptides and low-molecular weight poly-peptides (whey proteins). The filtrate is bacteria-free, casein-free and fat-free, and moreover it contains no calcium- and phosphate-ions because the casein otherwise binding the calcium- and phosphate-ions is not denatured in the process of the invention.

"Raw milk" and "Fresh milk" in the sense of this invention mean that fresh, untreated raw milk and fresh milk of domestic animal, preferably cow milk, is used and was subjected to none of convention heat treatments (pasteurization, ultra high heating and sterilization) employed by the dairies. However, the milk may be skimmed conventionally, for instance by centrifuging.

The following Examples elucidate the invention.

EXAMPLE 1

20 liters of fresh raw (cow) milk are subjected to tangential filtration using a polyvinylidene fluoride membrane with a pore size of 0.2 u. About 17 liters of filtrate and 3 liters of retentate are obtained. The retentate essentially consists of caseins and fat.

The filtrate (17 liters), dry substance about 6% and nitrogen content of the dry substance about 1.2% is fed to a second membrane filtration using a membrane with a cutoff at 6–10,000 molecular weight. About ½ to 1 liter of retentate are obtained containing mostly whey proteins and enzymes. The filtrate is about 16 liters and is fed to a third membrane filtration using a membrane with a cutoff of 1,000 molecular weight. In this case too only ½ to 1 liter of retentate are obtained. The product B/C is recovered from that retentate in the manner described further below.

Next, the filtrate is fed to reverse osmosis. An open membrane is used, the filtrate so obtained is concentrated to about 3 liters and left to stand for several hours in the refrigerator. A few products, in particular lactose, crystallize. The solids are filtered, the filtrate is concentrated until, by adding an approximately ten-fold volume of absolute ethanol, an ethanol content of about 80% results in the total mixture. The mixture is thoroughly agitated, then filtration or evacuation takes place regarding the undissolved components. The filtrate is concentrated till dry. The residue so obtained is extracted with 90–95% ethanol (from about ten-fold volume). The extract solution is filtered off or evacuated and concentrated. The residue is treated with an approximately ten-fold amount of chloroform or with an approximately ten-fold amount of isopropanol. The solution is evaporated and desired product A is obtained.

If a closed membrane is used in reverse osmosis, then the desired substance shall be in the retentate which then must be processed in the manner described above for the filtrate.

To prepare the product B/C, the retentate III from the third membrane filtration is mixed with about the five-fold amount of absolute ethanol resulting in a mixture being about 80% ethanol. This mixture is stirred intensively and allowed to stand for several hours, after which it is filtered from the undissolved constituents and concentrated till dry. Next the residue from the extractive treatment is post-treated with 25% aqueous ethanol (from the approximately ten-fold volume). Evacuation or filtration is carried out regarding the undissolved components, the filtrate is concentrated till dry and a second fraction of the product B/C s obtained. The two products may be combined.

EXAMPLE 2

A polyvinylidene fluoride membrane with a pore side of 0.2 u (DURAPORE, made by Millipore Co.), was cleaned and rinsed for an hour with water. The membrane fails to filter the milk clear.

Thereupon, the membrane is treated by means of 0.1% solution of fraction A (prepared in the manner of EXAMPLE 1) for 8 and for 14 h with continuous flow and at room temperature. Thereupon, the membrane is suitable to separate the dissolved and undissolved constituents of the milk. A clear filtrate is obtained. The properties of the membrane remain unchanged even after treatment with 0.3N NaOH.

The same results will be obtained when using a 0.6 u membrane.

EXAMPLE 3

A DURAPORE membrane (0.2 u) is cleaned and rinsed as described in EXAMPLE 2. Thereupon the membrane is treated in continuous flow for 3.5 h at room temperature with a 0.3% solution of Rt-103-25 (prepared per EXAMPLE 1). Following this pre-treatment, the membrane is suitable to separate the dissolved and undissolved constituents of the milk; a clear filtrate is obtained. A one-hour treatment of the pretreated membrane with 0.6% NaOH does not affect the properties of the membrane.

The same results are obtained when using a membrane with a 1 u pore size.

EXAMPLE 4

Four 0.2 u DURAPORE membranes were treated as follows:

Membrane 1: was cleaned and rinsed as in EXAMPLE 2;

Membrane 2: the cleaned membrane was treated for 2 h at room temperature with a 4% emulsion of rapeseed oil in water and continuous flow;

Membrane 3: the cleaned membrane was treated 8 h at room temperature with a 4% aqueous rapeseed oil emulsion in continuous flow;

Membrane 4: was treated first like Membrane 3 and then 2 h with an 8% total hydrolysate from raw milk.

By means of these membranes the attempt was made to separate the dissolved and undissolved constituents of milk. The filtrates so obtained are shown in FIG. 1. It is clear that the Membrane 1 allows no separation, while some separation is made possible by Membrane 2, Membrane 3 allows almost complete separation and Membrane 4 provides clear separation of the dissolved and undissolved constituents.

EXAMPLE 5

A 0.1 u polyvinylidene fluoride membrane (DURAPORE) was treated as described in EXAMPLE 2 and so cleaned. Next the membrane is treated 8 h in continuous flow with a 4% emulsion of sunflower oil in water, at room temperature. Thereupon the membrane was suitable to filter milk clear.

EXAMPLE 6

A 0.6 u polyvinylidene fluoride membrane (DURAPORE) was treated in continuous flow at room temperature with an 8% raw-milk total hydrolysate. After 8 h the milk could be filtered clear.

If the same membrane is treated 3½ h with a 0.5% solution of Rt-103-25 (made as in EXAMPLE 1), the same result is obtained.

Figure 3:
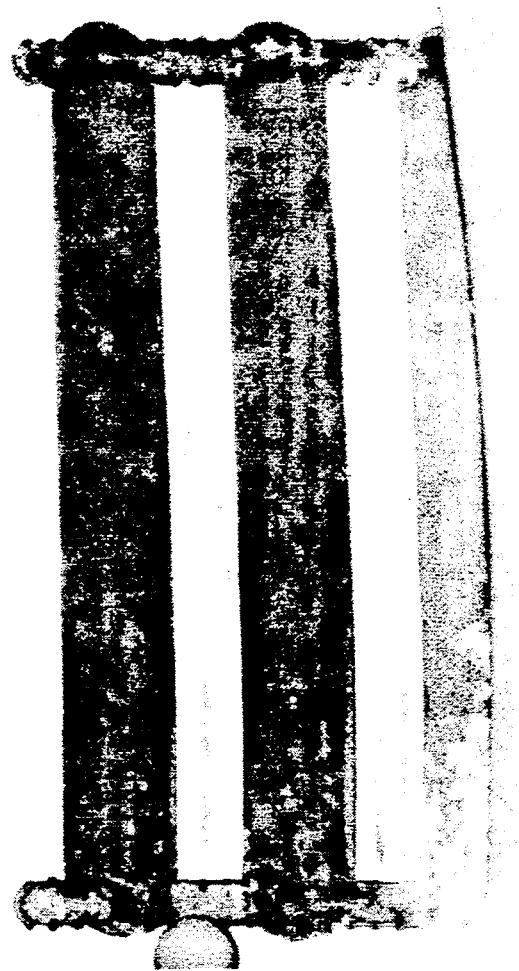
FIG. 3 is a reproduction of a membrane pretreated in the manner of the invention, following spraying with ninhydrin, in comparison with the untreated membrane.

If the membrane so pretreated is sprayed with ninhydrin reagent, blue coloration appears on the pretreated part of the membrane denoting the presence of peptide nitrogen (FIG. 3). The untreated parts of the membrane lack coloration (white strips in FIG. 3).

Figure 2:
FIG. 2 is a chromatogram (HPLC) of a filtrate obtained according to the invention.

As mentioned, the filtrate obtained in the manner of the invention contains the dissolved constituents of the milk, in particular the whey proteins. FIG. 2 illustratively shows the composition of the filtrate obtained in the invention. The chromatogram was obtained under the following conditions.

Column: J-125 Waters, Protein Pak
Mobile phase: 10% methanol; 0.5 ml/minute;
Extinction: 0 to 0.2; 224 nm;
Sample: 20 ul.

I claim:

1. A process for separating dissolved and undissolved constituents of milk comprising pretreating a polyvinylidene fluoride membrane with a pore size in the range of from 0.1 to 2 microns by exposing it to a flowing aqueous solution, dispersion or emulsion of lipids or peptides or a mixture thereof and separating said dissolved and undissolved constituents of milk by passing the milk through said pretreated membrane.

2. The process defined by claim 1, wherein said membrane has a pore size in the range of 0.1 to 1 micron.

3. The process defined by claim 2, wherein said pore size is in the range of 0.1 to 0.6 micron.

4. The process defined by claim 1, wherein said membrane is initially pretreated by exposing it to an aqueous solution, dispersion or emulsion of lipids and then pretreated by exposing it to an aqueous solution, dispersion or emulsion of peptides.

5. The process defined by claim 1, wherein said lipids are unsaturated vegetable oils.

6. The process defined by claim 5, wherein said lipids are members selected from the group consisting of rapeseed oil, sunflower oil, coconut oil, peanut oil, olive oil, maize germ oil and linseed oil.

7. The process defined by claim 1, wherein said peptides are members selected from the group consisting of peptides, peptide fractions and peptide extracts obtained from raw milk, or whey obtained from raw milk.

8. The process defined by claim 1, wherein said peptides are members selected from the group consisting of peptides, peptide fractions and peptide extracts obtained from the hydrolysates of raw milk, whey proteins, vegetable proteins, other animal proteins or bacterial proteins and enzyme-treated milk.

9. The process defined by claim 1, wherein said peptides are synthetic peptides.

10. The process defined by claim 1, wherein said peptides come from raw milk.

11. The process defined by claim 1, wherein said peptides are prepared by a process comprising:
subjecting untreated raw milk to membrane filtration using a 0.1 to 0.6 micron membrane to produce a first filtrate,
subjecting said first filtrate to a second membrane filtration using a membrane with a cutoff at 6–10,000 molecular weight to produce a second filtrate,
subjecting said second filtrate to a third membrane filtration using a membrane with a cutoff at 1,000 molecular weight to produce a third filtrate,
subjecting said third filtrate to reverse osmosis using an open membrane to produce a fourth filtrate,
concentrating said fourth filtrate to about 20% of the initial volume for the reverse osmosis, cooling the concentrated filtrate to precipitate a solid substance, filtering said solid substance to obtain a fifth filtrate, concentrating said fifth filtrate, setting the concentrated filtrate with absolute ethanol to an ethanol content of about 80% and filtering the concentrated filtrate to produce a sixth filtrate, concentrating said sixth filtrate, extracting the concentrated filtrate with 90 to 95% ethanol and filtering the extracted concentrated filtrate to produce a seventh filtrate, concentrating said seventh filtrate to produce a residue and extracting the residue with chloroform or isopropanol to produce an extract solution, concentrating said extract solution until dry and isolating the residue in the form of a nearly colorless solid substance.

12. The process defined by claim 1, wherein said peptides are prepared by a process comprising:

subjecting untreated raw milk to membrane filtration using a 0.1 to 0.6 micron membrane to produce a first filtrate, subjecting said first filtrate to a second membrane filtration using a membrane with a cutoff at 6–10,000 molecular weight to produce a second filtrate, subjecting said second filtrate to a third membrane filtration using a membrane with a cutoff at 1,000 molecular weight to produce a third filtrate, concentrating said third filtrate in vacuum and extracting the concentrated filtrate with ethanol at an ethanol content of 80% to produce an ethanol solution, concentrating said ethanol solution until dry to produce a colorless substance.

13. A microporous membrane prepared by a process comprising treating a polyvinylidene fluoride membrane with a pore size in the range of from 0.1 to 2 microns by exposing it to a flowing aqueous solution, dispersion or emulsion of lipids or peptides or a mixture thereof.

* * * * *